UNITED STATES PATENT OFFICE 2,125,393

β-HALOGENATED VINYL KETONES

Johannes Nelles and Otto Bayer, Leverkusen-I. G. Werk, Germany, assignors to I. G. Farbenindustrie Aktiengesellschaft, Frankfort-on-the-Main, Germany No Drawing. Application May 29, 1936, Serial No. 82,672. In Germany May 31, 1935

5 Claims. (Cl. 260—134)

The present invention relates to new condensation products and to a process of preparing the same.

In accordance with our present invention new condensation products are obtained which may be represented by the following probable formula:

R.CO.CH=CR'X wherein R and R' stand for hydrogen, alkyl or aryl radicals and X stands for a halogen atom.

These compounds are obtainable by causing carboxylic acid halides of the aliphatic or aromatic series to react upon acetylene or a homologue thereof in the presence of a Friedel Crafts' catalyst. Examples for suitable homologues of acetylene are methyl, ethyl, or phenyl acetylene or heptine. As examples for carboxylic acid halides there may be mentioned acetyl chloride, propionic acid chloride, butyric acid chloride, isovaleric acid chloride, stearic acid chloride or benzoyl chloride. Suitable catalysts are zinc chloride, aluminium chloride, tin tetrachloride, ferric chloride or borofluoride. The reaction can be performed in the presence of an indifferent solvent such as benzene or benzines, working under pressure being preferable in some cases.

The new products which are obtainable in accordance with our present invention are halogen containing vinyl ketones and show a remarkable tendency to decompose. Therefore, in order to store the products, a stabilizing agent will have to be added. Ethylene oxyde derivatives such as phenoxypropenoxide have proved to be suitable for the purpose in question. Our new products can be employed as intermediate products for the preparation of dyestuffs, artificial masses or auxiliary agents for the rubber and textile industries.

The following examples illustrate the invention without, however, restricting it thereto, the parts being by weight:—

*Example 1.*—8 parts of aluminium chloride are added while stirring and while introducing acetylene at a temperature of 0–5° C. to a solution of 10 parts of isovaleric acid chloride in 20 parts of petroleum ether. After some hours the reaction mixture is decomposed by the addition of ice water and extracted with benzene several times. The solution in benzene thus obtained is washed with a solution of potassium carbonate. The isobutyl-β-chlorvinylketone is obtained therefrom after evaporation of the benzene. It distils over at 12 mm. pressure at 63–65° C. The yield is about 85%.

*Example 2.*—85 parts of aluminium chloride or 100 parts of ferric chloride are gradually added in the course of several hours while stirring and while simultaneously introducing acetylene to 50 parts of acetyl chloride. After the addition of ice water to the reaction mixture the aqueous solution is extracted several times with benzene or ether. After evaporation of the solvent the methyl-β-chlorvinylketone is obtained which boils under a pressure of 12 mm. at 35–38° C. The yield is about 75%.

Aluminium chloride may be replaced with the same effect by anhydrous sublimed iron chloride.

*Example 3.*—28 parts of benzoyl chloride are mixed with 20 parts of heptine while cooling with ice and added to 26 parts of tin tetrachloride in the course of 1 hour. After some hours the brown reaction mixture is added to ice water and then extracted with benzene. The solution in benzene thus obtained is washed with aqueous sodium carbonate, then with water and then dried with calcium chloride. After distilling off the benzene a dark oil remains from which the phenylchlorheptenylketone may be isolated by vacuum distillation. It boils under 0.15 mm. pressure between 135–138° C.

*Example 4.*—To a mixture of 7 parts of acetyl chloride and 10 parts of heptine there are added while stirring at a temperature below 10° C. in the course of 3 hours 13 parts of aluminium chloride. After working up in the usual manner methylchlorheptenylketone is obtained which distils over under 15 mm. pressure at 96–105° C.

*Example 5.*—Into a solution of 100 parts of stearic acid chloride in 100 parts of carbon tetrachloride there are added while introducing acetylene 44 parts of aluminium chloride, moisture being precluded. The reaction being complete the melt is poured onto ice water and the reaction product is extracted with benzene or ether. After rinsing, drying and evaporation of the solvent the heptadecylchlorvinylketone is obtained in form of a brown viscous oil which contains a small amount of stearic acid.

*Example 6.*—Into a solution of 33 parts of β-chloropropionic acid chloride and 33 parts of carbon tetrachloride there are added 34 parts of aluminium chloride while stirring and gradually introducing acetylene at a superpressure of 20 mm. The absorption of the acetylene being finished the reaction product is decomposed by the addition of ice water. After working up in the usual manner 30 parts of the β-chloroethyl-β-chlorvinylketone is obtained as a colorless oil which boils at 78–80° C.

We claim:—

1. The products of the probable formula R.CO.CH=CHX wherein R stands for a member of the group consisting of hydrogen, alkyl and aryl radicals, and X stands for a halogen atom, these products being substantially identical with those obtainable by causing carboxylic acid halides selected from the group consisting of those of the aliphatic and aromatic series to react upon acetylene in the presence of a Friedel Crafts' catalyst.

2. The products of the probable formula R.CO.CH=CHCl wherein R stands for a member of the group consisting of hydrogen, alkyl and aryl radicals, these products being substantially identical with those obtainable by causing carboxylic acid chlorides selected from the group consisting of those of the aliphatic and aromatic series to react upon acetylene in the presence of a Friedel Crafts' catalyst.

3. The products of the probable formula R.COoCH=CHX wherein R stands for an alkyl radical and X stands for a halogen atom, these products being substantially identical with those obtainable by causing aliphatic carboxylic acid halides to react upon acetylene in the presence of a Friedel Crafts' catalyst.

4. The products of the probable formula R.CO.CH=CHCl wherein R stands for an alkyl radical, these products being substantially identical with those obtainable by causing aliphatic carboxylic acid chlorides to react upon acetylene in the presence of a Friedel Crafts' catalyst.

5. The product of the probable constitution methyl-β-chlorvinylketone, this product being substantially identical with that obtainable by causing acetyl chloride to react upon acetylene in the presence of a Friedel Crafts' catalyst.

JOHANNES NELLES.
OTTO BAYER.